G. WOLLENWEBER.
GRAPHICAL RECORDER.
APPLICATION FILED MAR. 15, 1917.
1,256,858.
Patented Feb. 19, 1918.
3 SHEETS—SHEET 2.
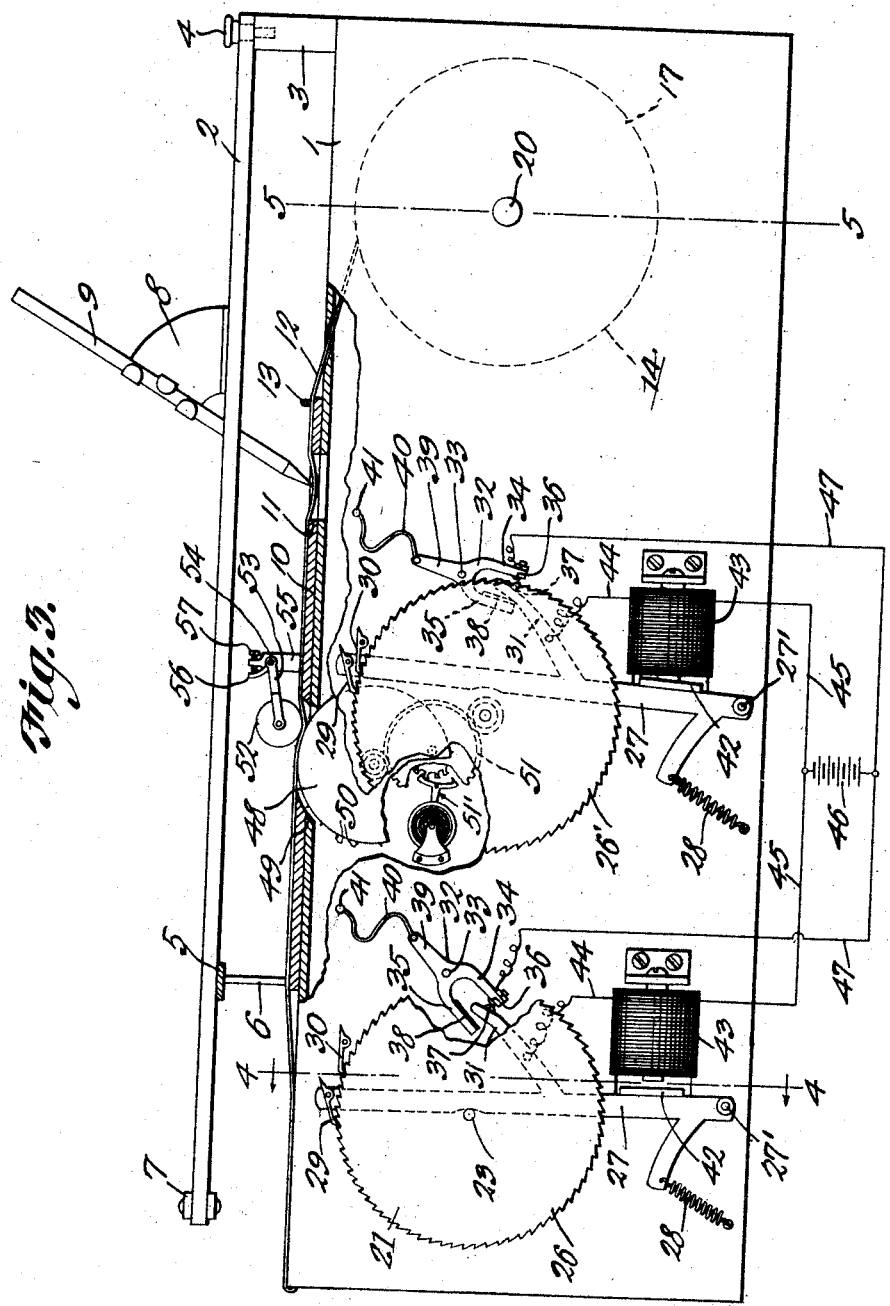
Witness
Inventor
G. Wollenweber
By C. A. Snow & Co.
Attorney

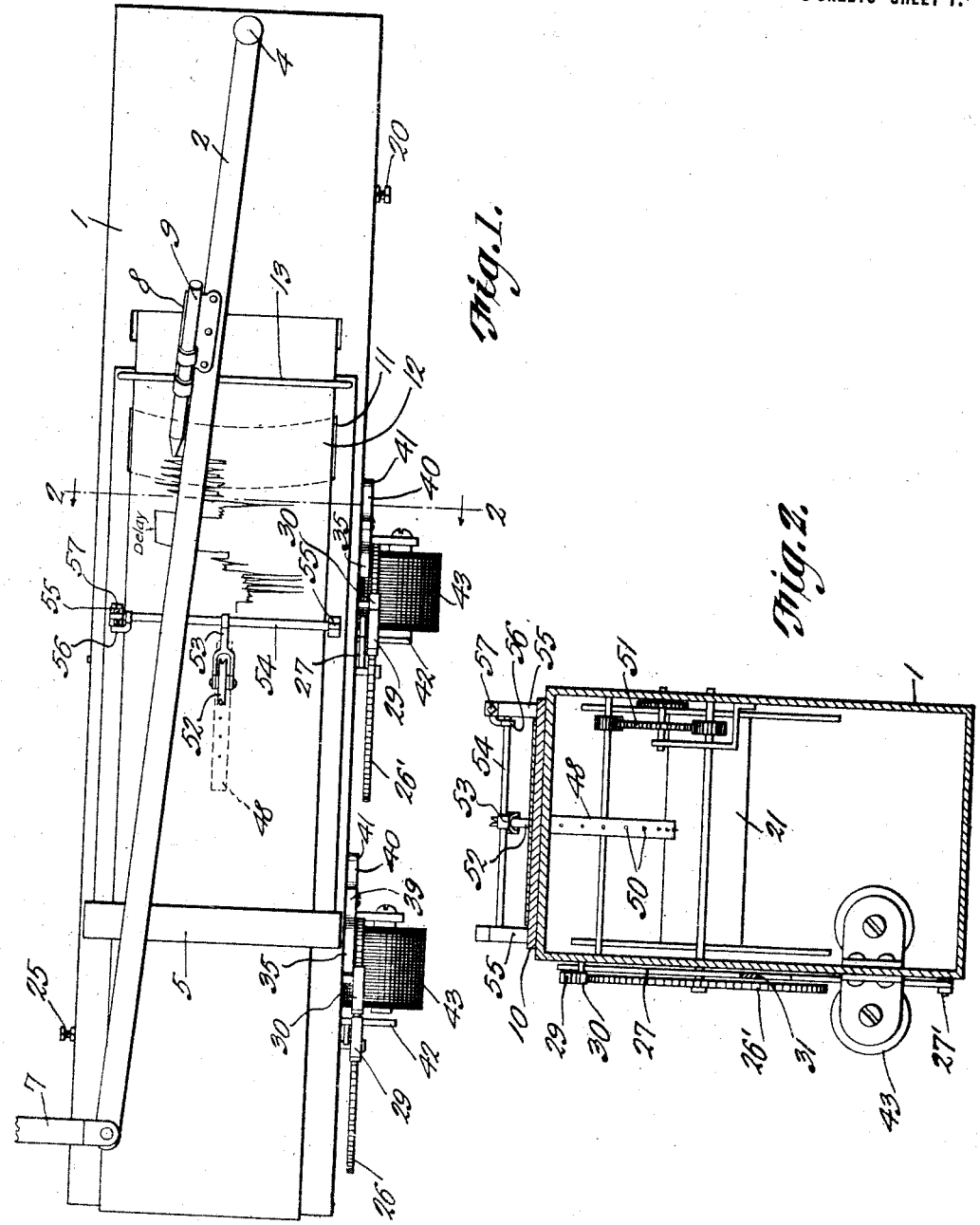

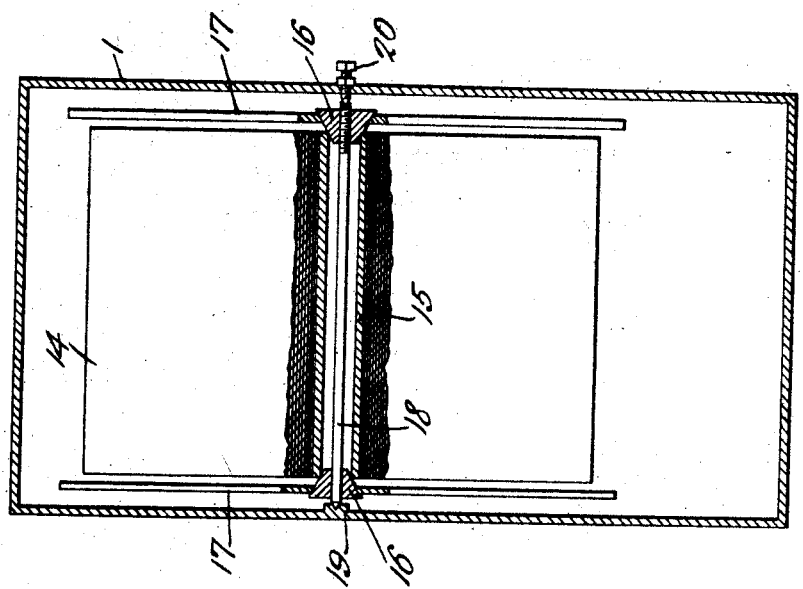
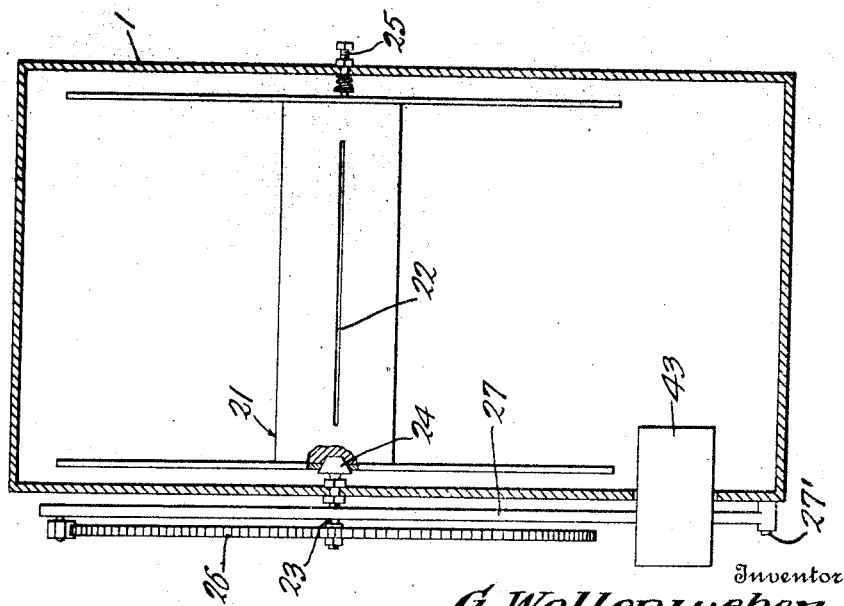

UNITED STATES PATENT OFFICE.

GAY WOLLENWEBER, OF WINTERHAVEN, FLORIDA.

GRAPHICAL RECORDER.

1,256,858.          Specification of Letters Patent.       Patented Feb. 19, 1918.

Application filed March 15, 1917. Serial No. 155,030.

*To all whom it may concern:*

Be it known that I, GAY WOLLENWEBER, a citizen of the United States, residing at Winterhaven, in the county of Polk and State of Florida, have invented a new and useful Graphical Recorder, of which the following is a specification.

The present invention appertains to recorders, and aims to provide a device of that character designed to record graphically the work done by a machine to which the recorder is connected by any suitable means.

The present recorder is especially useful in connection with dredges, steam shovels, cranes and the like, the operations of which are comparatively slow. In the case of dredging, each dipperful or scoopful of dirt is recorded and one can obtain the following data from the records: 1. The efficiency of the operator. 2. The efficiency of the fireman. 3. The time of starting and stopping the machine to check the time of the crews. 4. The actual working hours and hours of delay to indicate the efficiency of the plant as a whole. 5. The number of scoopfuls or dipperfuls per unit of time. 6. The time consumed is moving ahead and number of dipperfuls for each move. 7. An estimation of the yardage handled per shift by counting the number of dipperfuls recorded. 8. Where, in canal work, the dirt was picked up and on which side deposited. 9. The speed of operation, whereby to afford a reliable comparison of shifts, as well as a basis for the bonus system based on the actual hours of operation.

The object of the invention is to provide a graphical recorder of the nature indicated improved generally in its details of construction to enhance the utility and efficiency thereof.

Another object of the invention is the provision of an electrical clock for moving the strip of paper and for winding it up.

With the foregoing and other objects in view which will appear as the description proceeds, the invention resides in the combination and arrangement of parts and in the details of construction, hereinafter described and claimed, it being understood that changes in the precise embodiment of the invention herein disclosed can be made within the scope of what is claimed, without departing from the spirit of the invention.

The invention is illustrated in the accompanying drawings, wherein:—

Figure 1 is a plan view of the recorder.

Fig. 2 is a cross section taken on the line 2—2 of Fig. 1.

Fig. 3 is a side elevation, portions being broken away, and the electrical circuits being illustrated diagrammatically.

Figs. 4 and 5 are cross sections on enlarged scales taken on the respective lines 4—4 and 5—5 of Fig. 3.

In carrying out the invention, there is provided a casing or box-like frame 1, above which an arm 2 is mounted, one end of said arm being pivoted upon a post 3 upstanding from the casing 1 at one end thereof, the pivot being indicated at 4. A transverse guide bar 5 is supported by posts 6 which are arranged at the opposite sides of the casing, the arm 2 being slidable upon the guide bar 5 near its free end whereby to guide the arm for oscillatory movement in a plane parallel with the top of the casing. The free end of the arm is connected by a link 7 or otherwise with the machine, as for example, with the boom or swinging member of a dredging apparatus, whereby the arm 2 is oscillated in synchronism with the corresponding part of the machine to which it is connected. A central holding bracket 8 is carried by the arm 2 between its ends, and carries a pencil or marking element 9, which is preferably inclined.

A horizontal plate 10 is mounted upon the top of the casing and is provided underneath the pencil with a transverse opening 11 over which the strip of paper 12 passes in moving over the plate 10. A transverse guide rod 13 is carried by the forward end of the plate 10 for guiding the paper onto the plate and over the opening 11. A roll of paper, designated 14, is provided in the forward end of the casing underneath the top thereof, from which the strip of paper unrolls and passes upwardly through a slot or opening in the top of the casing onto the plate 10. This roll 14 has a tubular core or spool member 15 upon which the paper is wound, and as a convenient means for mounting the roll of paper within the casing, cones 16 are fitted within the ends of the member 15, and disks 17 mounted upon the cones at the opposite sides of the roll assist in guiding the paper and prevent it from being displaced. The cones 16 are mounted upon a transverse shaft or spindle 18, one cone being fixed thereon, and the other being threaded, whereby the latter cone can be removed for the removal of the member 15 and the replacement of an exhausted roll by a new one. When the threaded cone is screwed into place, the tubular member 15 will be clamped between the cones and centered relative to the shaft 18. One end of said shaft pivotally engages a suitable bearing 19 carried by one side of the casing, and an adjustable pivot member 20 is carried by the opposite side of the casing for pivotally engaging the other end of the shaft. The pivot member 20 can be retracted to release the shaft 18, in order that the exhausted roll of paper can be replaced by a new roll, as above indicated.

A reel or spool 21 is located within the rear end of the casing for winding up the strip of paper thereon, the hub of the reel having a slot 22 into which the end of the strip is inserted to assure of its being wound upon the reel, when the reel is rotated. A shaft 23 is journaled to one side of the casing and has a member 24 to non-rotatably engage one end of the reel hub, and a spring pressed pivot member 25 is carried by the other side of the casing to be projected into pivotal engagement with the other end of the reel hub. When the member 25 is retracted, the reel 21 can be removed. A ratchet wheel 26 is secured to the outer portion of the shaft 23 for the operation of the reel 21 by one of the electric clocks or actuating mechanisms.

There are two electric clocks or actuating mechanisms, both located at one side of the casing, as illustrated, and since the clock mechanisms are duplicates of one another, a description of one will suffice for both. Each of said mechanisms embodies an upwardly projecting lever 27 pivoted at its lower end, as at 27', to one side of the casing. A spring 28 is connected to the lever for pulling it in one direction, whereby a pawl 29 carried by the upper free end of the lever will engage the ratchet wheel 26 or a ratchet wheel 26' whichever is the case. The reverse rotation of the ratchet wheel is prevented by a pawl 30. The lever 27 has an arm 31 extending at an angle therefrom and coöperable with a Y-shaped lever 32 fulcrumed between its ends, as at 33, to the side of the casing. One arm of the lever 32 is bifurcated to provide the spaced fingers 34 and 35, the former of which carries a contact 36 to be engaged by a contact 37 carried by the arm 31. The finger 35 carries a block or piece of insulation 38 to bear against the arm 31, said arm projecting between the fingers 34 and 35. The other arm 39 of the circuit interrupting lever or switch 32 has a leaf spring 40 pivotally connected therewith. This leaf spring is bent into S-shape, so that it is of the expansion type, its ends tending to move away from one another. The other end of the spring is pivotally connected, as at 41, with the casing, whereby that end of the spring which is pivoted to the arm 39 tends to swing the arm 39 in one direction or the other around the fulcrum or pivot 33 of the lever 32. Thus, when the arm 39 is swung in either direction slightly beyond a straight line between the fulcrum 33 and pivot point 41, the spring 40 will by a sharp movement complete the movement of the lever 32 in the corresponding direction. The lever 27 is moved against the tension of the spring 28 by means of an armature 42 carried by the lever and attracted by an electric magnet 43 carried by the side of the casing. One terminal of the magnet is connected by a conductor 44 with the arm 31 so as to be connected with the contact 37, and the other terminal of the magnet is connected by a conductor 45 with one pole of a battery 46 or other suitable source of electrical energy which has its other pole connected by a conductor 47 with the contact 36.

When the lever 27 is pulled in one direction by the spring 28, the pawl 29 in engaging the ratchet wheel will advance the same one step, the spring 28 always exerting the same tension, whereby to provide for a uniform step by step movement of the ratchet wheel. The movement of the lever 27 under the influence of the spring 28 causes the arm 31 to strike the insulation 38 and thereby swing the finger 35 with the arm 31, and as the lever 27 completes its movement by the action of the spring 28, the arm 39 of the lever 32 is moved past dead center or a line connecting the fulcrum 33 and pivot point 41, so that the spring 40 will by quick action swing the lever 32 clockwise, as seen in Fig. 3, thereby bringing the contact 36 into engagement with the contact 37, the insulation 38 now being moved away from the arm 31. The two contacts engaging one another, will close the electrical circuit including the battery 46, conductor 47, contact 36, contact 37, arm 31, conductor 44, electromagnet 43 and conductor 45. The magnet is thus energized to attract the armature 42 and swing the lever 27 backwardly against the tension of the spring 28, thus returning the pawl 29 for a new operation. When the lever 27 is swung backwardly by the magnet, the arm 31 will swing the finger 34 with it and during this movement of the lever, the arm 39 of the lever 32 is swung beyond dead center position, whereby the contact 36 will be moved away from the contact 37, the insulation 38 striking the arm 31. This will open the circuit, and the spring 28 will then assert itself and swing the lever 27 for advancing the ratchet wheel, the finger 35 being moved by the arm 31, as above described, thereby completing the cycle of operation, which is repeated. The mechanism is therefore operated electrically, the circuits being made and broken quickly and effectively by the operation of the circuit interrupting lever or switch 32.

One of the clock mechanisms operates the shaft 23 through the medium of the ratchet wheel 26, whereby to wind up the strip upon the reel 21. The other clock mechanism operates the paper feeder consisting of a wheel 48 mounted for rotation within the casing with its upper portion projecting upwardly through a slot 49 in the top of the casing and plate 10. The feeder wheel 48 has outstanding pins or spurs 50 upon its periphery to perforate the paper and cause it to feed positively when the wheel 48 is rotated. Said wheel is connected by a train of gears 51 with a ratchet wheel 26' operated by the step by step movement by the second clock mechanism. A balance wheel and escapement 51' are preferably connected with the train of gears 51, to render the rotation of the wheel 48 steady. A grooved pressure wheel 52 rests upon the paper and presses it down upon the wheel 48, the grooved periphery of the wheel 52 straddling the row of pins 50. This wheel 52 is carried by a bifurcated arm 53 attached to a transverse shaft 54 having its ends journaled to posts 55 carried by the casing at opposite sides thereof. A lug 56 carried by the shaft 54 is engaged by an adjusting screw 57 carried by one of the posts 55, to press the wheel 52 downwardly at the desired pressure.

The strip of paper 12 extends from the roll 14 under the guide rod 13, thence over the opening 11, and thence over the wheel 48 and under the wheel 52, and thence to the rear end of the casing to the reel 21 upon which the paper is wound. The point of the pencil or marking element 9 bears upon the paper over the opening 11, and presses the paper downwardly within said opening slightly, so that the pull of the paper will assure of the marking of the paper by the pencil. The paper is fed rearwardly at a certain rate of speed by one clock mechanism, and the other clock mechanism serves to wind up the paper at the rear end of the casing upon the reel 21. Thus, when the arm 2 is oscillated due to its connection with the boom of a dredge, or the like, the pencil will indicate by an appropriate line on the paper, the operation of the machine. When the boom is swung toward one side for dumping, the line made by the pencil will run toward the corresponding side edge of the strip of paper, and vice versa, and delays due to the advancing of the dredge, will be indicated by longitudinal portions of the line, as seen by reference to Fig. 1. Those ends of the arcs made by the oscillations of the pencil which are nearest the longitudinal median line of the paper, will indicate the points where the dirt is taken from the canal or the like, and the line will indicate the number of dipperfuls made per unit of time and between changes of position, etc. From the foregoing, taken in connection with the drawings, it is believed that the advantages and attributes of the recorder will be manifest without further description being necessary.

The record obtained by the present device is continuous, and any portion thereof can be removed whenever desired.

Attention is directed to the fact that the reel upon which the strip is wound, in being operated by the clock, will provide a compensating device, to assist the feeder wheel 48 in moving the strip rearwardly, and thus avoid the tearing of the paper by the pins 50. In other words, the rear wheel and clock tend to wind up the strip and create a tension thereon, whereby the feeder wheel 48 can move the strip easily as it is operated by the other clock mechanism.

Having thus described the invention, what is claimed as new is:—

1. A graphical recorder embodying a marking element to engage the paper, feeding means for the paper, and a clock mechanism for operating the feeder means embodying a ratchet wheel connected thereto, an oscillatory member having a pawl engaging the ratchet wheel, a spring for moving said member in one direction, an electromagnet for moving said member in the other direction, and means operated by said member for making and breaking the circuit of the magnet.

2. A graphical recorder embodying a movable marking element to engage the paper, paper feeding means, and a clock mechanism for the feeding means embodying a ratchet wheel connected thereto, an oscillatory lever, a pawl carried by the lever and engaging the ratchet wheel, a spring connected to the lever to swing it in one direction, an electromagnet for swinging the lever in the opposite direction, and an oscillatory member for making and breaking the circuit of the magnet, said member being spring pressed to move to one position or the other, and said member and lever having coöperable means whereby the oscillation of the lever oscillates said member from one position to another.

3. A graphical recorder a marking element, paper feeding means, and means for operating the feeding means including a ratchet wheel connected thereto, an oscillatory member, a pawl carried by said member engaging the ratchet wheel, a spring for moving said member in one direction, an electromagnet for moving said member in the opposite direction, and a spring pressed circuit interrupting member movable by spring tension to either of two positions, said members having coöperable means whereby the movement of the first mentioned member moves the second mentioned member toward one position or another, and said members having means for closing the circuit of the magnet when in one position and opening the circuit when in the other position.

4. A graphical recorder embodying a movable marking element, paper feeding means, and a clock mechanism for actuating the said paper feeding means including a ratchet wheel connected thereto, a lever, a pawl carried by the lever engaging the ratchet wheel, a spring for swinging the lever in one direction, a magnet for swinging the lever in the opposite direction, a pivotally mounted bifurcated member, the lever having a portion projecting within said member for oscillating it, and a spring connected to said member for moving it to one position or another, said portion and one of the portions of said member having contacts for closing the circuit of the magnet when the lever is moved by the spring.

5. A graphical recorder embodying a movable marking element, paper feeding means, and a clock mechanism for actuating said means including a ratchet wheel connected thereto, a lever, a pawl carried by the lever and engaging the ratchet wheel, a spring connected to the lever for swinging it in one direction, a magnet for moving the lever in the opposite direction, a Y-shaped lever fulcrumed between its ends, the first mentioned lever having an arm projecting within the bifurcated arm of the Y-shaped lever, and an S-shaped spring having one end connected to the other arm of the Y-shaped lever for moving said lever to one position or the other, one portion of said bifurcated arm having a contact to engage the arm of the first mentioned lever when the first mentioned lever is moved by the spring, to close the circuit of the magnet.

In testimony that I claim the foregoing as my own, I have hereto affixed my signature in the presence of two witnesses.

GAY WOLLENWEBER.

Witnesses:
A. S. THARPE,
J. E. CRUMP.